United States Patent
Luschi et al.

(10) Patent No.: US 8,189,653 B2
(45) Date of Patent: May 29, 2012

(54) RADIO RECEIVER IN A WIRELESS COMMUNICATIONS SYSTEM

(75) Inventors: Carlo Luschi, Oxford (GB); Simon Huckett, Bristol (GB); Simon Walker, Crowthorn (GB); Steve Allpress, Bristol (GB); Philip Jones, Swindon (GB)

(73) Assignee: Icera, Inc., Wilmington, MA (US)

( * ) Notice: Subject to any disclaimer, the term of this patent is extended or adjusted under 35 U.S.C. 154(b) by 991 days.

(21) Appl. No.: 12/016,640

(22) Filed: Jan. 18, 2008

(65) Prior Publication Data
US 2009/0110049 A1   Apr. 30, 2009

(51) Int. Cl.
*H03H 7/30* (2006.01)
(52) U.S. Cl. ......... 375/232; 375/341; 375/343; 375/350
(58) Field of Classification Search .................. 375/323, 375/341, 343, 350
See application file for complete search history.

(56) References Cited

U.S. PATENT DOCUMENTS

| | | | | |
|---|---|---|---|---|
| 6,324,220 | B1* | 11/2001 | Sellars | 375/296 |
| 7,050,513 | B1* | 5/2006 | Yakhnich | 375/341 |
| 2003/0058962 | A1* | 3/2003 | Baldwin | 375/316 |
| 2007/0076791 | A1* | 4/2007 | DiFazio et al. | 375/229 |

FOREIGN PATENT DOCUMENTS

| | | |
|---|---|---|
| EP | 1 359 674 | 11/2003 |
| WO | 0148966 | 7/2001 |
| WO | 0223742 | 3/2002 |
| WO | 2007107805 | 9/2007 |

OTHER PUBLICATIONS

Klein, A., *Data detection algorithms specially designed for the downlink of CDMA mobile radio systems*, IEEE Vehicular Technology Conference, Vo. 1, May 1997, pp. 203-207.
Sampath, A., et al, *Estimation of maximum Doppler frequency for handoff decisions*, IEEE Vehicular Technology Conference, May 1993, pp. 859-862.
Tepedelenlioglu, A., et al., *Estimation of Doppler spread and signal strength in mobile communications with applications to handoff and adaptive transmisison*, Wireless Communications and Mobile Computing, vol. 1, No. 2, Mar. 2001, pp. 221-242.
Luschi, C., et al., *Adaptive channel memory truncation for TDMA Digital Mobile Radio*, IEEE International Workshop on Intelligent Signal Processing and Communication Systems, Nov. 1998, pp. 665-669.
Arslan, H., et al., *Delay spread estimation for wireless communication systems*, IEEE International Symposium on Computers and Communication, Jun.-Jul. 2003, pp. 282-287.

(Continued)

*Primary Examiner* — Kabir A Timory

(57) ABSTRACT

Techniques are described for optimizing processing facilities of a receiver in a wireless communication environment, taking into consideration processing performance set against the computing resources and/or power consumption required to obtain the processing performance. An embodiment of a radio receiver is described that includes a channel equalization means arranged to receive digital samples of an incoming signal and to generate an equalized output, said channel equalization means including means for processing said digital samples in accordance with an equalizer algorithm utilizing a set of equalizer parameters. The receiver can include means for estimating at least one parameter of a channel over which the signal has been received, and means for selecting at least one of said equalizer parameters based on at least one of said estimated channel parameters. Related methods, algorithms, and computer program products are also described.

21 Claims, 5 Drawing Sheets

OTHER PUBLICATIONS

Bistritz, Y., *Zero location with respect to the unit circle of discrete-time linear system polynomials*, Proceedings of the IEEE, vol. 72, No. 9, Sep. 1984, pp. 1131-1142.

Turkboylari, et al., *An efficient algorithm for estimating the signal-to-interference ratio in TDMA cellular systems*, IEEE Transaction on Communications, vol. 46, No. 6, Jun. 1998, pp. 728-731.

Lucky, R.W., et al., *Automatic equalization for digital communication*, Proceedings of the IEEE, pp. 96-99, 1965.

Proakis, et al., *An adaptive receiver for digital signaling through channels with intersymbol interference*, IEEE Transactions on Information Theory, vol. 15, No. 4, Jul. 1969, pp. 484-497.

Qureshi, S., *Adaptive equalization*, Proceedings of the IEEE, vol. 73, No. 9, Sep. 1985, pp. 1349-1387.

Salz, J., *Optimum mean-square decision feedback equalization*, The Bell System Technical Journal, vol. 52, No. 8, Oct. 1973, pp. 1341-1373.

Belfiore, et al., *Decision feedback equalization*, Proceedings of the IEEE, vol. 67, No. 8, Aug. 1979.

Forney, G., *Maximum-likelihood sequence estimation of digital sequences in the presence of intersymbol interference*, IEEE Transactions on Information Theory, vol. 18, No. 3, May 1972, pp. 363-378.

Bahl, L.R., et al., *Optimal decoding of linear codes for minimizing symbol error rate*, IEEE Transactions on Information Theroy, vol. 20, Mar. 1974, pp. 284-287.

Treichler, et al., *Fractionally spaced equalizers*, IEEE Signal Processing Magazine, vol. 13, No. 3, pp. 65-81.

Luschi, C., et al., *Advanced signal-processing algorithms for energy-efficient wireless communications*, Proceedings of the IEEE, vol. 88, No. 10, Oct. 2000, pp. 1633-1650.

Hooli, K., et al., *Performance evaluation of adaptive chip-level channel equalizers in wcdma downlink*.

D.P. Taylor, et al., *Wireless Channel Equalization*, European Transactions on Telecommunications, vol. 9, No. 2, pp. 117-143, Mar. 1998.

Hardouin, E., et al., "Environment-Adaptive Receivers: A Performance Prediction Approach", IEEE International Conference, Jun. 1, 2006, pp. 5709-5714.

Dumais, P., et al., "On the implementation of a multi-equalizer", IEEE-Newcas Conference, Jun. 19, 2005, pp. 292-295.

International Search Report for related PCT Application No. PCT/EP2008/064461, 4 PP.

Written Opinion for related PCT Application No. PCT/EP2008/064461, 6 PP.

Naofal Al-Dhahir, Fast Computation of Channel-Estimate Based Channel Equalizers in Packet Data Transmission, IEEE Transactions on Signal Processing, vol. 43, No. 11, Nov. 1995, pp. 2642-2473.

L. Mailaender, Bell Labs, Lucent Technology USA, Low Complexity Implementation of CDMA Downlink Equalization, 3G Mobile Communication Technologies, Mar. 26-28, 2001, pp. 396-400, Conference Publication No. 477@ IEE 2001.

* cited by examiner

RADIO RECEIVER IN A WIRELESS COMMUNICATIONS SYSTEM

This application claims priority to GB Application No.: 0721424.0 filed 31 Oct. 2007, the contents of which are incorporated herein by reference in its entirety.

The present invention relates to a radio receiver in a wireless communications system, and to a method of processing radio signals.

The transmission of radio signals carrying data in modern wireless communications can be realized based on a number of different communications systems, often specified by a standard. There are increasing requirements for devices which are able to operate to support more than one of these wireless communications systems. Mobile radio receiver devices include analog radio frequency (RF)/intermediate frequency (IF) stages, which are arranged to receive and transmit wireless signals via one or more antennas. The output of the RF/IF stages is typically converted to baseband, where an Analog-to-Digital Converter (ADC) converts incoming analog signals to digital samples, which are then processed for signal detection and decoding of the data in the form of reliability values. The ADC may alternatively operate directly at IF, in which case the conversion to baseband is performed in the digital domain. A number of different types of front end processing of the digital samples are known to implement signal detection, including rake receiver processing and channel equalisation processing.

In Code Division Multiple Access (CDMA) wireless systems, different physical channels are multiplexed in the code domain using separate spreading sequences. In the case of orthogonal spreading codewords, the original data symbols can then be effectively separated at the receiver by despreading.

In a Wideband CDMA (WCDMA) cellular system, downlink code multiplexing is performed using Orthogonal Variable Spreading Factor (OVSF) codes. However, the OVSF codewords are orthogonal to each other only under the condition of perfect time alignment. In the presence of multipath propagation, the code orthogonality is lost, and the operation of despreading is affected by Multiple Access Interference (MAI).

CDMA mobile radio receivers conventionally employ a rake processor which relies on the correlation properties of the spreading sequences. A rake processor is described for example in J. G. Proakis, "Digital Communication", New York, McGraw-Hill, 1995. This type of receiver is subject to performance degradation in the presence of code correlation, if the MAI between code-multiplexed transmission is comparable to the other sources of noise and interference. Under these conditions, a performance advantage may be achieved by attempting to restore the orthogonality between the codes before despreading. The sub-optimality of conventional 3GPP receivers based on rake processing causes a significant performance penalty, especially for downlink data rates increasing from the 384 kbps for WCDMA Release 99 to High Speed Downlink Packet Access (HDSPA) rates of several Mbps. When the code orthogonality is destroyed by multipath, an effective approach is to use channel equalisation instead of rake processing.

Channel equalisation techniques have been widely employed over the last decades for combating intersymbol interference on frequency selective transmission channels. Channel equalization techniques are described in J. G. Proakis, "Digital Communication", New York, McGraw-Hill, 1995, and S. Benedetto, E. Biglieri, and V. Castellani, "Digital Transmission Theory", Englewood Cliffs, N.J., Prentice-Hall, 1987. Channel equalisers have recently found application in receivers for Time Division Multiple Access (TDMA) and Code Division Multiple Access (CDMA) mobile wireless systems. An example of application of channel equalisation to a CDMA cellular system is described in A. Klein "Data Detection Algorithms Specially Designed for the Downlink of CDMA Mobile Radio Systems", in Proceedings of IEEE Vehicular Technology Conference, vol. 1, Phoenix, Ariz., May 1997, pp. 203-207. In particular in synchronous CDMA cellular systems, as in the case of the forward link of the 3GPP WCDMA standard, chip level equalisation allows to significantly improve the performance over conventional rake receivers, at the cost of an increased implementation complexity. This advantage is especially important for high rate data transmission, as in 3GPP high speed downlink packet access (HSDPA).

It is an aim of the present invention to optimise the processing facilities of a receiver in a wireless communication environment, in particular taking into account processing performance set against the computing resources and/or power consumption required to obtain that processing performance.

According to an aspect of the present invention there is provided a radio receiver for a wireless communication system comprising: channel equalisation means arranged to receive digital samples of an incoming signal and to generate an equalised output, said channel equalisation means comprising means for processing said digital samples in accordance with an equaliser algorithm utilising a set of equaliser parameters; means for estimating at least one parameter of a channel over which the signal has been received; and means for selecting at least one of said equaliser parameters based on at least one of said estimated channel parameters.

Another aspect of the invention provides a method of processing radio communication signals in a radio receiver, the method comprising: receiving digital samples of an incoming radio communication signal and processing those samples in accordance with an equaliser algorithm utilising a set of equaliser parameters to generate an equalised output; estimating at least one parameter of a channel over which the incoming signal has been transmitted; and selecting at least one of said equaliser parameters based on at least one of said estimated channel parameters.

A computer program product is also provided which implements the method defined above when executed on a processor. In this case, the processor can constitute the same processing means as the one that executes the equaliser algorithms themselves. That is, the program for selecting one of a plurality of equaliser parameters can be executed by the same processor that executes the algorithms themselves to implement an equaliser function.

The inventors have realised that the extent to which channel equalisation can provide an optimised trade-off between superior performance and use of the available processing resources and/or power consumption is dependent on certain channel conditions. More particularly, the inventors have appreciated that the particular equalisation parameters which is used to implement the channel equalisation can provide different benefits in dependence on certain channel conditions.

In this context, the word channel is used to denote the communication path of the radio signals. According to the communication system used, channels can be defined by time, code or frequency, as is well known in the art. The quality of particular channels is affected by conditions related to the propagation environment, the cellular layout and other conditions in the wireless communications system.

For a better understanding of the present invention and to show how the same may be carried into effect, reference will now be made by way of example to the accompanying drawings in which.

Figure 1:
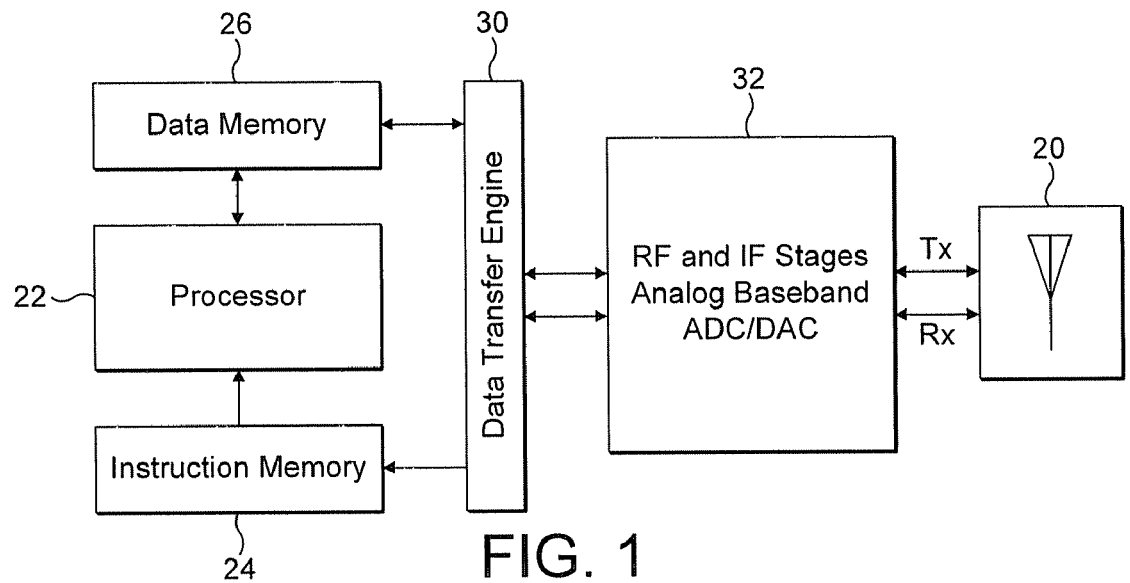
FIG. 1 is a schematic block diagram of a wireless communications device.

FIG. 1 is a schematic block diagram of a device for transmitting and receiving signals in a wireless communications system. Such a device can be implemented in a number of different ways, but in accordance with FIG. 1 a series of RF/IF stages 32 is arranged to receive and transmit wireless signals (TX, RX) via one or more antennas 20. The embodiments of the present invention discussed herein are principally concerned with receiving wireless signals, and so that transmit signals will not be mentioned further. The received signal at the output of the RF/IF stages is typically converted to baseband, where an ADC converts the analog signal into digital samples. The block 32 of FIG. 1 includes components for processing the received radio signals and providing digital signal samples r(k). This can be achieved in different ways, which are known in the art and which are not discussed further herein.

The samples r(k) are supplied to a data transfer engine 30 which communicates with a processor 22, an instruction memory 24 and a data memory 26. The processor 22 is responsible for processing the samples r(k). The processor 22 can execute a number of different functions which are held in an instruction memory 24 in the form of code sequences. This provides a so-called soft modem which has a number of advantages discussed further herein.

Figure 3:
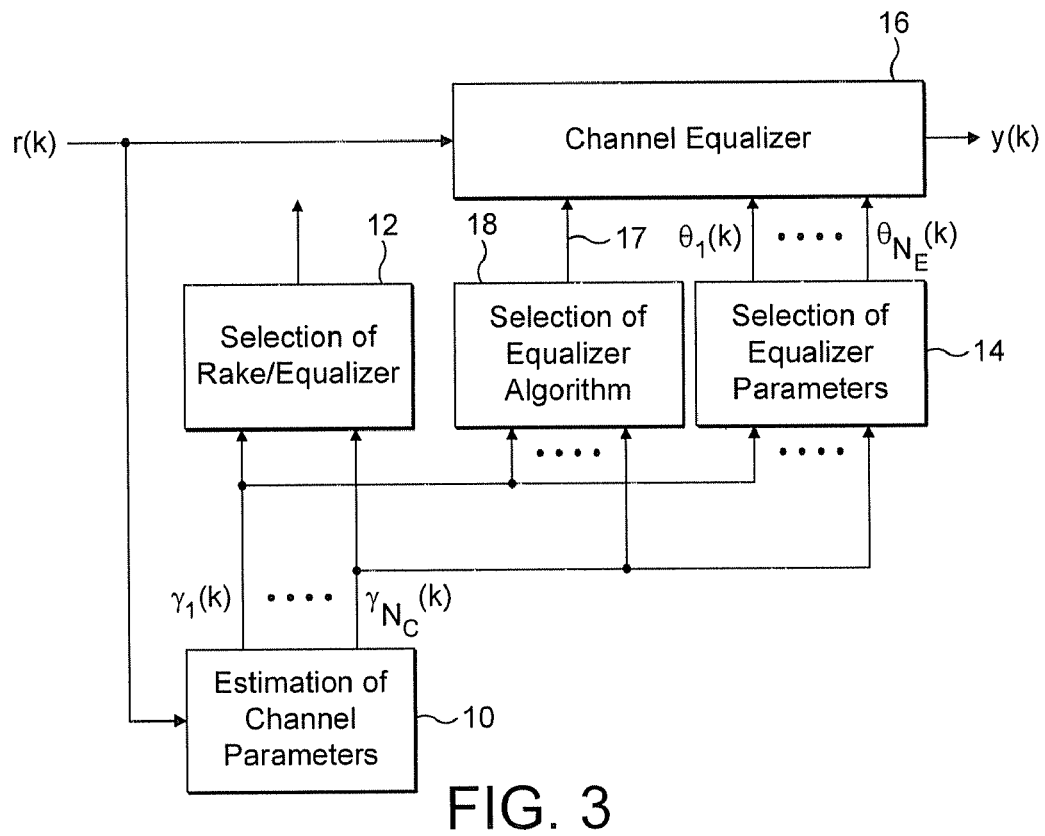
FIG. 3 is a schematic block diagram of processing functions.
Figure 2:
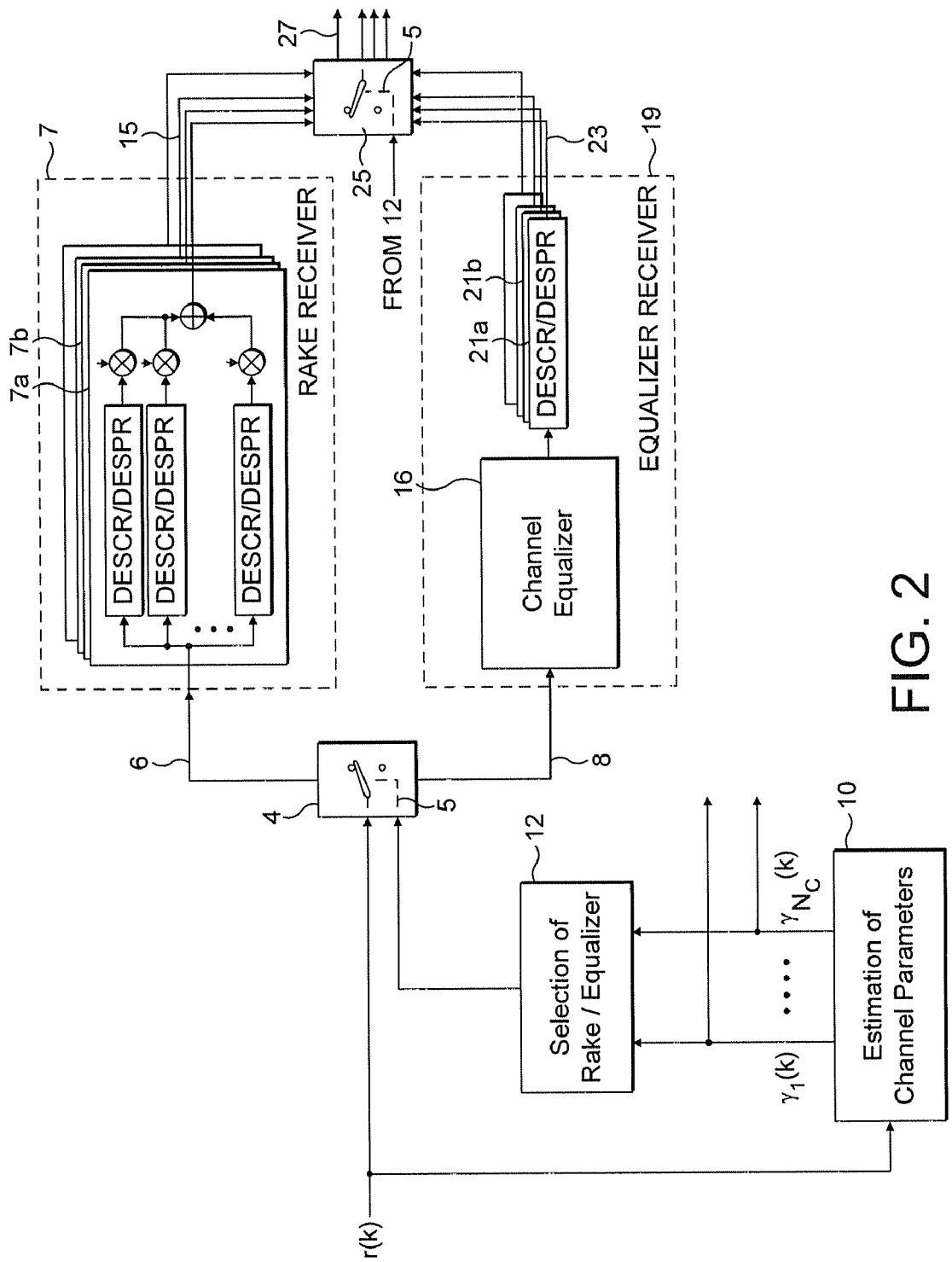
FIG. 2 is a block diagram showing selection between rake receiver processing and equaliser processing.

FIG. 2 and FIG. 3 are schematic block diagrams which illustrate some among a number of different functions that are executed by the processor 22. A first function denoted by block 10 is referred to as estimation of channel parameters. This function estimates a number of different parameters related to the communication channels over which the radio signals are transmitted in the wireless communication system. The function 10 provides at time k the outputs $\gamma_n(k)$, $n=1, \ldots, N_C$, where $N_C$ denotes the number of estimated channel parameters, that represent a set of channel parameters derived from the received signal samples r(k). The estimated channel parameters $\gamma_n(k)$ can be used for a number of different purposes. As illustrated in FIG. 2 and FIG. 3, they are supplied to a Selection of Rake/Equaliser Receiver function 12 which determines whether to process the received samples using a rake receiver or an equaliser receiver. The rake receiver or equaliser receiver is implemented by the processor 22 executing the appropriate code sequence from the instruction memory 24.

The parameters $\gamma_n(k)$ are further supplied to a Selection of Equaliser Algorithm function 18 which is used in the event that an equaliser receiver 16 is selected. If used, the function 18 selects a particular algorithm for implementing the equaliser receiver 16 based on the channel parameters which have been estimated. The algorithm is supplied to the channel equaliser as denoted diagrammatically by input 17. In practice of course this will be implemented by the appropriate algorithm being selected as a code sequence from the instruction memory.

The channel parameters $\gamma_n(k)$ are also supplied to a Selection of Equaliser Parameters function 14. The equaliser parameter selection function 14 is used in the event that an equaliser receiver is selected (as denoted by block 16) and controls parameters used for implementing the equaliser receiver, these parameters being denoted $\theta_n(k)$, $n=1, \ldots, N_E$, where $N_E$ denotes the number of relevant equaliser parameters.

The use of the estimated channel parameters to control the selection of a rake receiver or equaliser receiver (function 12) will now be discussed in more detail. FIG. 2 illustrates the concept in schematic form. The digital samples r(k) are supplied to a switch 4 which has an input 5 receiving the command signal for the selection of rake receiver or equaliser processing from the function 12. In accordance with this signal, the switch 4 selects a processing path 6 via a rake receiver 7, or a processing path 8 via an equaliser 9. As is known in the art, the rake receiver includes a set of rake fingers 7a, 7b, . . . , for each channel transmitted on a separate channelization code. Each finger is associated with a single descrambler/despreader 9 and a weighting function 11, and the set of fingers relative to each channel are associated to an adder 13 providing a processed output on output path 15. As the operation of a rake receiver is well understood to a person skilled in the art, its function will not further be described here.

The equaliser receiver 19 comprises a chip level equaliser 16 and a plurality of descramblers/depreaders 21a, 21b, . . . for each channel transmitted on a separate channelization code. The outputs of the descramblers/despreaders are supplied along output path 23. An output switch 25 provides processed outputs on lines 27 to subsequent decoding functions. The switch 25 is (like the switch 4) controlled by control input 5 which receives the command signal for the selection of rake receiver or equaliser from the function 12.

While FIG. 2 illustrates the concept of processing function selection, it will readily be appreciated that in the embodiment of the invention illustrated in FIG. 1 it is not possible to identify different physical paths (6, 8, 15, 23). Instead, selection is made by downloading different code sequences dependent on whether a rake receiver function or equaliser receiver function is to be executed by the processor 22.

In such a software implementation of the receiver, where only either rake or equaliser processing is performed at any given time, the above approach also provides an overall reduction of computational complexity with respect to a conventional receiver implementing a channel equaliser in hardware. In this respect conventional modems based on a hardware implementation are forced to the choice between a design dictated by the maximum data rate requirements and the instantiation of multiple algorithms as separate areas of silicon. These solutions imply higher implementation costs, size and/or power consumption and any compromise would inevitably penalise performance. On the other hand, the proposed solution allows to reduce complexity, size and cost by reusing a common platform to adaptively select the optimum set of signal processing functions capable of maximising performance and minimise power consumption.

Figure 4:
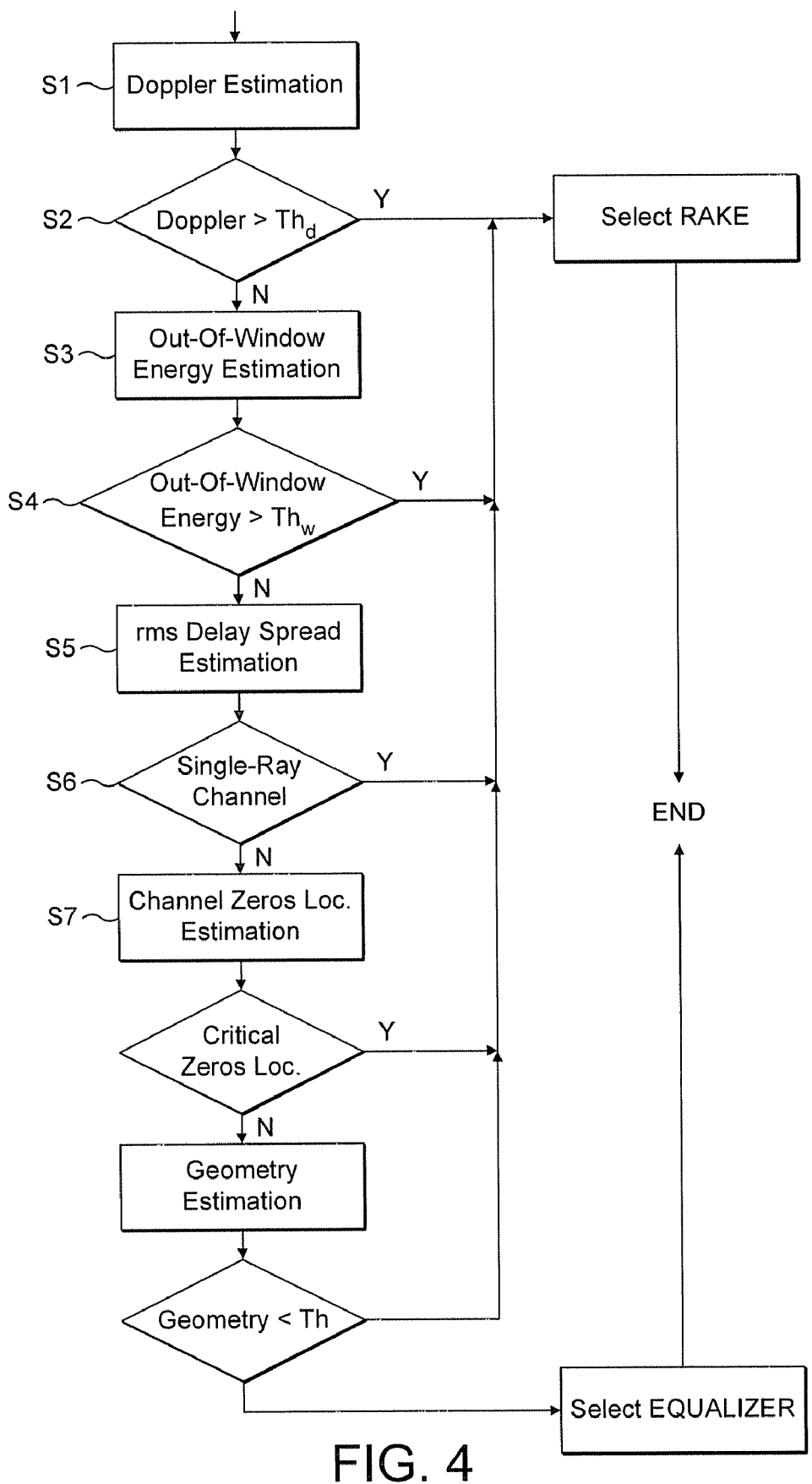
FIG. 4 is a schematic diagram of a sequence of steps for selecting a processing function.

Reference will now be made to FIG. 4 to describe a method of selecting a processing function based on the estimation of particular channel parameters. The inventors have found that it is advantageous to apply the selection criteria by examining different channel parameters in a certain sequence (as illustrated in FIG. 4 and described below). It will readily be appreciated however that other appropriate sequences may also be utilised.

Step S1 produces an estimate of the degree of non-stationarity of the channel, related to mobility of the user of the transmission channel, given for example by an estimate of the Doppler spread or the maximum Doppler frequency or by an estimate of the relative speed of the mobile terminal. These estimators are known in the art and so the manner in which it is estimated is not discussed further herein. Examples are described in G. L. Stuber, "Principles of Mobile Communications", Norwell, Mass., Kluwer, 1996, A. Sampath and J. M. Holtzman, "Estimation of Maximum Doppler Frequency for Handoff Decisions", in Proceedings of IEEE Vehicular Technology Conference, Secaucus, N.J., May 1993, pp. 859-862, C. Tepedelenlioglu, A. Abdi, G. B. Giannakis, and M. Kaveh, "Estimation of Doppler spread and Signal Strength in Mobile Communications with Applications to Handoff and Adaptive Transmission", Wireless Communications and Mobile Computing, vol. 1, no. 2, pp. 221-242, March 2001, and references therein. The receiver can be designed to use equaliser processing for relatively low time-varying channels, and to switch to rake processing for fast time-varying channels, where the switching threshold should depend on the desired trade-off between equaliser complexity and receiver performance A Doppler comparison step S2 compares a Doppler estimation signal $\gamma_1$ with a suitable threshold $Th_D$. If $\gamma_1$ exceeds the threshold $Th_D$, the step selects rake receiver processing. If the Doppler estimation signal $\gamma_1$ does not exceed the threshold $Th_D$, the comparison produces a negative answer, and the selection process continues with an out-of-window energy comparison step.

The out-of-window energy estimation S3 provides an estimate of the channel energy outside the time window used for equaliser channel estimation. An example is described in C. Luschi, M. Sandell. P. Strauch, and R.-H. Yan, "Adaptive Channel Memory Truncation for Digital Mobile Communications", in Proceedings of IEEE International Workshop on Intelligent Signal Processing and Communication Systems, Melbourne, Australia, November 1998, pp. 665-669. Equaliser processing is selected only when a significant percentage of the channel energy is captured by the channel estimation window—which will not happen in the case of very high delay spread). To this end, the out-of-window energy $\gamma_2$ is compared with a threshold $Th_W$. If $\gamma_2$ is greater than the threshold $Th_W$, the step selects rake receiver processing. If the out-of-window energy $\gamma_2$ is not greater than $Th_W$, to the selection process continues with a single-ray channel detection step.

A delay spread estimation S5 generates an output $\gamma_3$, given for example by an estimate of the root mean square (rms) delay spread. An example of delay spread estimation is given in H. Arslan and T. Yucek, "Delay Spread Estimation for Wireless Communication System", in Proceedings of IEEE International Symposium on Computers and Communication, Kemer-Antalya, Turkey, June-July 2003, pp. 282-287. The parameter $\gamma_3$ is supplied to the single-ray channel detection step S6 to determine if the transmission channel can be considered to result from a single propagation path (multipath absent). In case of single-path propagation, the step selects rake receiver processing.

More generally identification of the conditions of very high delay spread (long channel impulse response) and zero delay spread (single ray channel impulse response) can be used to switch the receiver to rake receiver processing. The term "channel length" is often used in the art to denote the temporal duration of the channel impulse response, which is related to the channel delay spread.

In the event of non single-ray channel, the process passes to an estimate of channel characteristics from the location of the channel zeros in the z-plane (S7). Examples of how this is done are given in Y. Bistritz, "Zero Location with Respect to the Unit Circle of Discrete-Time Linear System Polynomials", Proceedings of the IEEE, vol. 72, no. 9, pp. 1131-1142, September 1984, and references therein. The receiver may be designed to switch to rake processing in the presence of locations of the zeros that identify channel characteristics that are critical for the operation of the equaliser—as in the case of linear equalisation with channel zeros close to the unit circle of the z-plane, or for fractionally-spaced equalisation or, more generally receive diversity equalisation (multiple receive antennas or multiple subchannels obtained by oversampling) with common zeros among the equaliser subchannels. The estimate of the channel zeros location $\gamma_4$ is supplied to a critical zeros location detector step S8, which selects rake receiver processing in the presence of the locations of zeros which would be critical for operation of an equaliser. In case of non-critical channel characteristics, the selection process continues with a cell geometry comparison step.

A cell geometry estimation block provides an estimate $\gamma_5$ of the ratio between received intracell power and noise-plus-intercell interference power (or its inverse), or an estimate of the ratio between total received power and noise-plus-intercell interference power (or its inverse). An example of a cell geometry estimation technique that can be used is described in our copending application [PWF Ref. 316036 GB]. Alternatively, any known technique for estimating signal to disturbance ratios on an incoming radio signal can be used, where disturbance is interference or noise or both. An example of signal to disturbance ratio estimation for a wireless cellular system is given in M. Turkboylari and G. L. Stuber, "An Efficient Algorithm for Estimating the Signal-to-interference Ratio in TDMA Cellular Systems", IEEE Transactions on Communications, vol. 46, no. 6, pp. 728-731, June 1998. As a further alternative, an estimate of the signal to disturbance ratio $\gamma_6$ of the estimated channel response can be used, or any other indication of the quality of the available channel estimate.

In addition to switching between the rake and equaliser, in the case that the equaliser 16 has been selected the channel parameters estimated by the channel parameter estimation function 10 can be used to select the parameters $\theta_n$, n=, ..., $N_E$ for the implementation of the equaliser 16.

Figure 5:
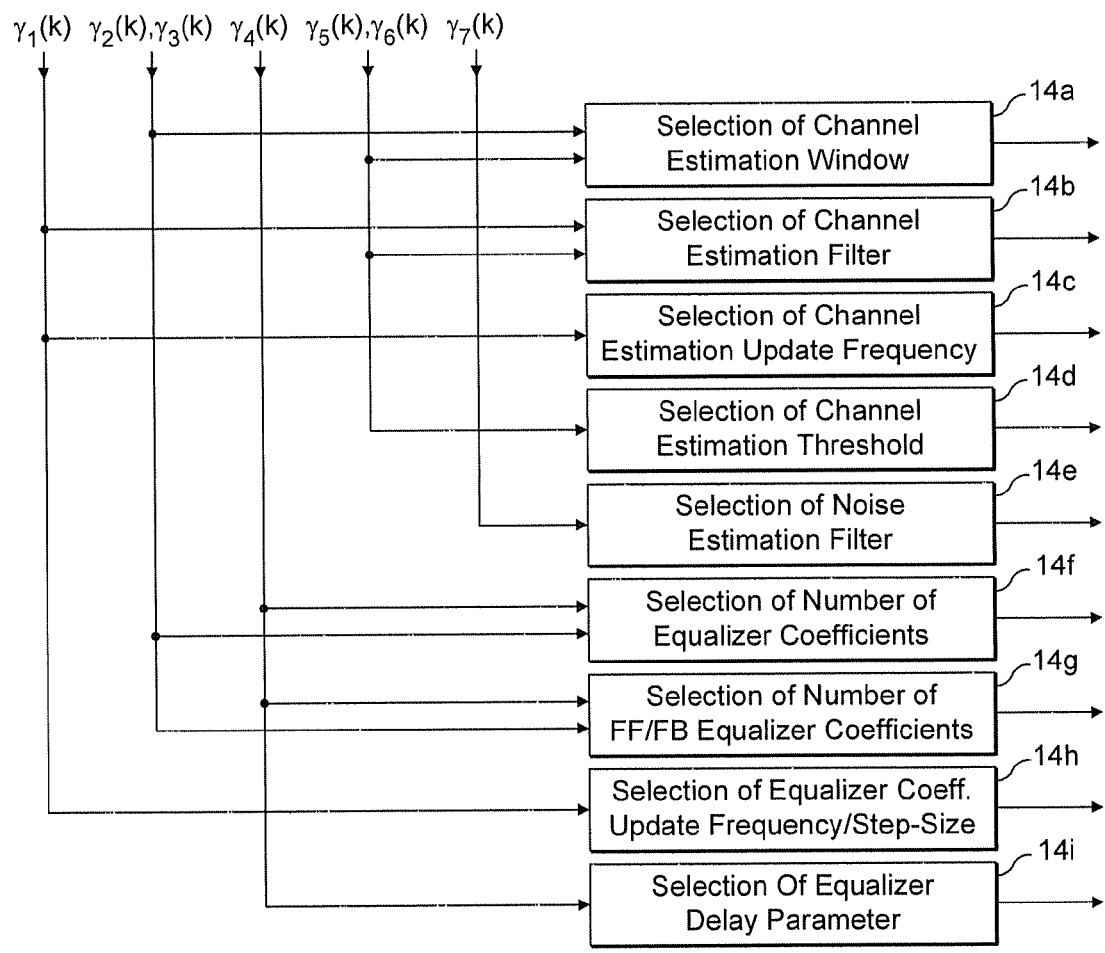
FIG. 5 is a schematic block diagram for the selection of a set of equaliser parameters.

FIG. 5 is a schematic block diagram for the selection of a set of equaliser parameters within the equaliser parameter selection function 14.

The time window W for estimation of the channel impulse response in the equaliser can be selected on the basis of estimates of the channel out-of window energy $\gamma_2$ and/or of the channel delay spread $\gamma_3$ (block 14a of FIG. 5). This selection mat also depend on an estimate $\gamma_5$ of the input signal-to-disturbance ratio or the cell geometry, and/or on an estimate $\gamma_6$ of the signal-to-disturbance ratio for the estimated channel coefficients.

The memory of an appropriate filter for estimation of the channel impulse response (block 14b of FIG. 5) and the frequency of update of the estimated channel impulse response (block 14c of FIG. 5) can be selected on the basis of an estimate of the degree of channel non-stationarity or temporal selectivity, for example through an estimate of the channel Doppler spread $\gamma_1$. The selection of the channel estimation filter could also be based on an estimate $\gamma_5$ of the input signalto-disturbance ratio or the cell geometry, and/or on an estimate $\gamma_6$ of the signal-to-disturbance ratio of the estimated channel response.

At intermediate to low signal to noise-plus-interference ratios, the total channel estimation error can be reduced by setting to zero the estimated channel coefficients with amplitude lower than a suitable threshold. The value of this threshold can be selected based on an estimate $\gamma_5$ of the input signal-to-disturbance ratio or the cell geometry, and/or on an estimate $\gamma_6$ of the signal-to-disturbance ratio for the estimated channel coefficients (block 14*d* of FIG. 5).

The memory of appropriate filters for estimation of the input noise variance $\sigma^2$, for example in the case of MMSE equalisation, can be made adaptive in the presence on non-stationary input noise by measuring the degree of non-stationarity of the input disturbance $\gamma_7$ (for instance, the time interval over which the noise is approximately constant) (block 14*c* of FIG. 5). On a completely different basis, the filtering may depend on the periodicity with which it is convenient to collect observations on the input noise—this in turn may be motivated simply by the need to reduce the implementation complexity in specific operating conditions or under critical processing requirements.

The number of equaliser coefficients (i.e., the equaliser time span) can be selected for example on the basis of estimates of the channel out-of window energy $\gamma_2$ and/or of the channel length or the channel delay spread $\gamma_3$ and on an estimate of the position of the channel zeros in the z-plane $\gamma_4$ (block 14*f* of FIG. 5).

The number of feedforward and feedback equaliser coefficients in the case of decision feedback equalisation can similarly be based on estimates of the channel out-of-window energy $\gamma_2$ and/or of the channel length (or the channel delay spread) $\gamma_3$ and the position of the channel zeros in the z-plane $\gamma_4$ (block 14*g* of FIG. 5).

The frequency of update of the equaliser coefficients in the case of block equalisation, or the coefficient step size in the case of adaptive equalisation, can be selected on the basis of an estimate of the degree of channel non-stationarity or temporal selectivity, e.g. through an estimate of a channel Doppler spread r, (block 14*h* of FIG. 5).

The equaliser delay can be selected on the basis of an estimate of the channel phase characteristics derived from location of the channel zeros in the z-plane $\gamma_4$ (block 14*i* of FIG. 5).

Figure 6:
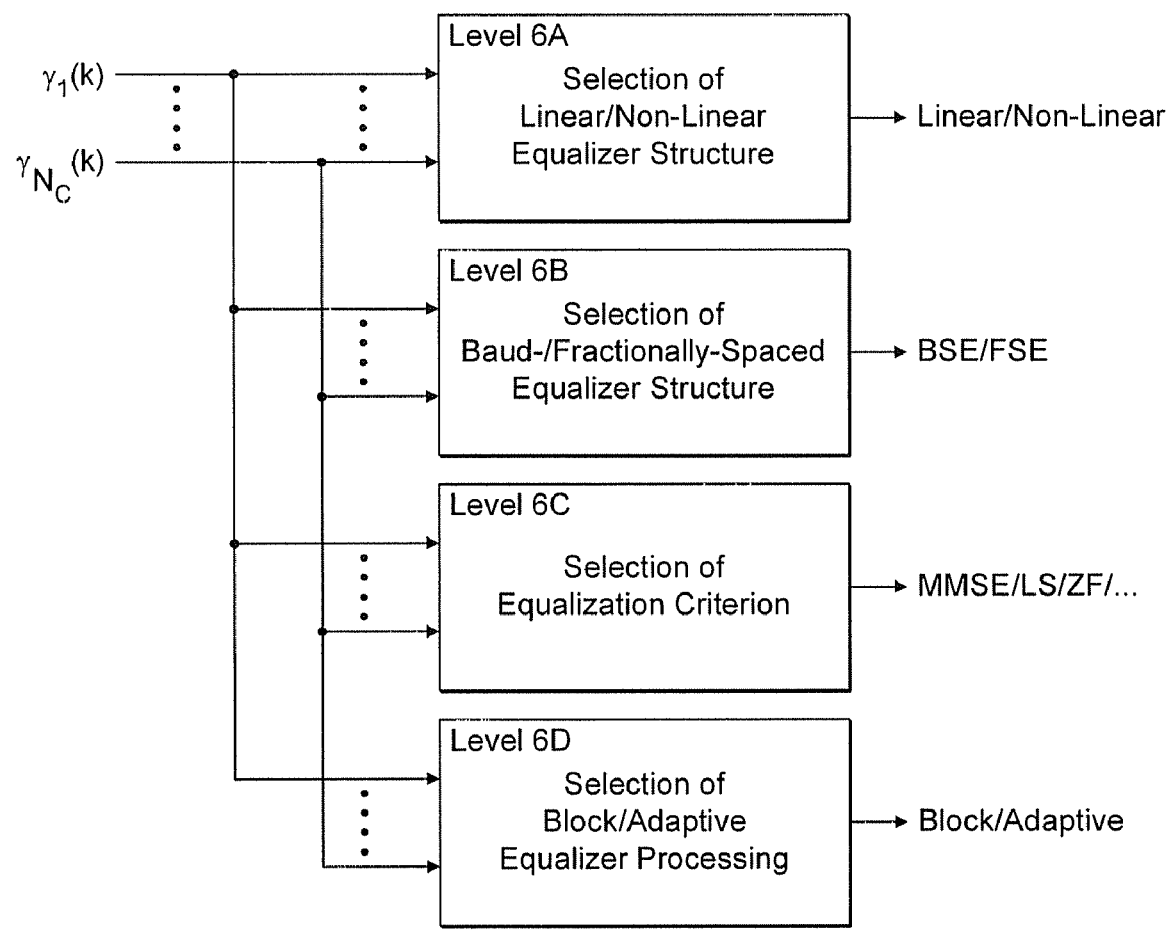
FIG. 6 is a schematic block diagram for the selection of the equaliser algorithm.

Reference will now be made to FIG. 6 which is a schematic block diagram illustrating the selection of a particular equalisation algorithm based on the estimated channel conditions. While the sequence described below represents one useful embodiment of the invention, it will be appreciated that any other sequence can be utilised to implement selection of the appropriate equaliser algorithm.

Level 6*a* in FIG. 6 denotes the selection of a linear or non-linear equaliser structure. Linear equalisation based on a transversal filter structure has been employed since the early work of Lucky (R. W. Lucky, "Automatic Equalization for Digital Communication", Bell System Technical Journal, vol. 44, pp. 547-588, April 1965), Proakis and Miller (J. G. Proakis and J. H. Miller, "An Adaptive receiver for Digital Signaling Through Channels with Intersymbol Interference", IEEE Transactions on Information Theory, vol. 15, no. 4, pp. 484-497, July 1969) and others (see S. U. H. Qureshi "Adaptive Equalization", Proceedings of the IEEE, vol. 73, no. 9, pp. 1349-1387, September 1985 and references therein). Non-linear equalisers include decision-feedback equalisers (described for example in J. Salz, "Optimum Mean Square Decision Feedback Equalization", Bell System Technical Journal, vol. 52, pp. 1341-1373, October 1073, and C. A. Belfiore and J. H. Park, Jr., "Decision Feedback Equalization", Proceedings of the IEEE, vol. 67, no. 8, pp. 1143-1156, August 1979) and maximum-likelihood (ML) or maximum a posteriori probability (MAP) trellis equalisers (described for example in G. D. Forney, Jr., "Maximum Likelihood Sequence Estimation of Digital Sequences in the Presence of Intersymbol Interference", IEEE Transactions on Information Theory, vol. 18, no. 3, pp. 363-378, May 1972, and L. R. Bahl, J. Cocke, F. Jelinek, and Raviv, "Optimal Decoding of Linear Codes for Minimizing Symbol Error Rate", IEEE Transactions on Information Theory, vol. 20, pp. 284-287, March 1974). Linear and non-linear equalisers are also discussed in S. Benedetto, E. Biglieri, and V. Castellani, "Digital Transmission Theory", Englewood Cliffs, N.J., Prentice-Hall, 1987 and D. P. Taylor, G. M. Vitetta, B. D. Hart, and A. Mammela, "Wireless Channel Equalization", European Transactions on Telecommunications, vol. 9, no. 2, pp. 117-143, March 1998. A criterion for making the choice between a linear or non-linear equaliser can be based for example on the location of channel zeros in the z-plane $\gamma_4$. In addition, this selection could depend on specific transmission conditions. For instance, in an HSDPA system, the use of a decision feedback equaliser (that is, having a non-linear structure) may be limited to a condition where the user is allocated a significant percentage of the downlink power—which determines the portion of the downlink signal that can be used for decision feedback without requiring to make decisions on other user's data.

Level 6*b* in FIG. 6 denotes the selection of Baud-spaced or fractionally-spaced equaliser structure. Baud-spaced (symbol- or chip-spaced) and fractionally spaced equalisers are described for example in S. U. H. Qureshi "Adaptive Equalization", Proceedings of the IEEE, vol. 73, no. 9, pp. 1349-1387, September 1985 and J. R. Treichler, I. Fijalkow, and C. R. Johnson, Jr., "Fractionally Spaced Equalizers", IEEE Signal Processing Magazine, vol. 13, no. 3, pp. 65-81, May 1996. This selection is made based for instance on the location of the channel zeros in the z-plane $\gamma_4$, and could optionally take into account the amount of excess transmission bandwidth (roll-off factor of transmit and receive filters).

It will be clear that either baud-spaced or fractionally spaced design can be used with either of the linear or non-linear selections.

Level 6*c* in FIG. 6 denotes the selection of the equaliser cost function, specifically between the options of Minimum Mean-Square Error (MMSE) criterion, Least-Squares (LS) criterion, Zero-Forcing (ZF) criterion, or a criterion based on a different cost, including the maximum-likelihood (ML) criterion and the maximum a posteriori probability (MAP) criterion. MMSE, LS, ZF and ML equalizers are described in S. U. H. Qureshi "Adaptive Equalization", Proceedings of the IEEE, vol. 73, no. 9, pp. 1349-1387, September 1985 and S. Benedetto, E. Biglieri, and V. Castellani, "Digital Transmission Theory", Englewood Cliffs, N.J., Prentice-Hall, 1987, while MAP equalisers are discussed in D. P. Taylor, G. M. Vitetta, B. D. Hart, and A. Mammela, "Wireless Channel Equalization", European Transactions on Telecommunications, vol. 9, no. 2, pp. 117-143, March 1998 and C. Luschi et al., "Advanced Signal Processing Algorithms for Energy-Efficient Wireless Communications", Proceedings of the IEEE vol. 88, no. 10, pp. 1633-1650, October 2000. Parameters that can be used to select between these criteria include an estimate of the signal-to-disturbance ratio or other parameters indicative of the statistical distribution of the disturbance. For instance, acceptable performance can be obtained for high signal-to-disturbance ratios using the ZF criterion.

On the other hand, the use of a LS equaliser is preferable with respect to a MMSE equaliser in the presence of non-Gaussian disturbance.

Level 6d in FIG. 6 denotes the choice between equaliser block processing or the implementation of a tap adaptation rule. The selection between these two strategies may be made dependent on the degree of channel non-stationarity or temporal selectivity, e.g. through an estimate of a channel Doppler spread $\gamma_1$.

Block processing is mentioned for example in A. Klein, "Data Detection Algorithms Specially Designed for the Downlink of CDMA Mobile Radio Systems", in Proceedings of IEEE Vehicular Technology Conference, vol. 1, Phoenix, Ariz., May 1997, pp. 203-207. An adaptive algorithm is mentioned in K. Hooli, M. Latva-aho and M. Juntti, "Performance Evaluation of Adaptive Chip-Level Channel Equalizers in WCDMA Downlink", in Proceedings of IEEE International Conference on Communications, vol. 6, Helsinki, Finland, June 2001, pp. 1974-1979.

The invention claimed is:

1. A method of processing radio signals in a radio receiver, the method comprising:
   receiving digital samples of an incoming radio signal and processing those samples in accordance with an equaliser algorithm utilizing a set of equaliser parameters to generate an equalised output;
   estimating at least one parameter of a channel over which the incoming signal has been transmitted, wherein the channel has energy outside a predefined temporal window and one of said estimated channel parameters provides an estimate of the energy of the channel outside the predefined temporal window; and
   selecting at least one of said equaliser parameters based on at least one of said estimated channel parameters, wherein said at least one of said equaliser parameters is used to implement the equaliser algorithm.

2. A method according to claim 1, wherein one of said channel parameters represents a degree of non-stationarity of the channel.

3. A method according to claim 2, wherein the channel parameter representing the degree of non-stationarity is a Doppler estimate.

4. A method according to claim 2, wherein the non-stationarity channel parameter is used to select at least one of the following equaliser parameters:
   memory of a filter for estimating a channel response;
   frequency of update of the estimated channel response; and
   frequency of update of the equaliser coefficients or coefficient step size for adaptive equalisation.

5. A method according to claim 1, wherein a channel delay spread is estimated and one of said estimated channel parameters provides an estimate of the channel delay spread.

6. A method according to claim 5, wherein a root-mean square channel delay spread is estimated and the channel parameter representing the channel delay spread is the estimated root-mean square channel delay spread.

7. A method according to claim 5, wherein the channel length or channel delay spread parameter is used to select at least one of the following equaliser parameters:
   time window for estimation of the channel response;
   number of equaliser coefficients or equaliser time span; and
   number of feedforward and/or feedback equaliser coefficients for decision feedback equalisation.

8. A method according to claim 1, wherein channel zeroes have a z-plane location and one of said channel parameters estimates the location of the channel zeros in the z-plane.

9. A method according to claim 8, wherein the estimate of the location of the channel zeros is used to select at least one of the following equaliser parameters:
   number of equaliser coefficients or equaliser time span;
   number of feedforward and/or feedback equaliser coefficients for decision feedback equalisation; and
   equaliser delay parameter.

10. A method according to claim 1, wherein one of said channel parameters is a signal-to-disturbance ratio of the incoming signal.

11. A method according to claim 10, wherein the channel parameter signal-to-disturbance ratio represents the signal-to-disturbance ratio of channel response estimated in the receiver.

12. A method according to claim 10, wherein the channel parameter signal-to-disturbance ratio is used to select at least one of the following equaliser parameters:
   threshold parameters for estimated channel tap;
   time window for estimation of the channel response;
   memory of the filter for estimation of the channel response.

13. A method according to claim 1, wherein one of said channel parameters is an estimate of cell geometry or its inverse.

14. A method according to claim 13, wherein the channel parameter cell geometry or its inverse is used to select at least one of the following equaliser parameters:
   threshold parameters for estimated channel tap;
   time window for estimation of the channel response;
   memory of the filter for estimation of the channel response.

15. A method according to claim 1, wherein an input disturbance has a degree of non-stationarity and one of said channel parameters is an estimate of the degree of non-stationarity of the input disturbance.

16. A method according to claim 15, wherein the channel parameter representing the degree of non-stationarity of the input disturbance is an estimate of a time interval over which the input disturbance can be considered approximately constant.

17. A method according to claim 15, wherein the time interval over which the input disturbance is approximately constant is used to select at least one of the following equaliser parameters:
   memory of the filter for estimation of the input disturbance.

18. A method according to claim 1, wherein the parameter estimated channel energy outside a predefined window is used to select at least one of the following equaliser parameters:
   time window for estimating a channel response;
   number of equaliser coefficients or equaliser time span; and
   number of feedforward and/or feedback equaliser coefficients for decision feedback equalisation.

19. A radio receiver for a wireless communication system comprising:
   channel equalisation means arranged to receive digital samples of an incoming signal and to generate an equalised output, said channel equalisation means comprising means for processing said digital samples in accordance with an equaliser algorithm utilizing a set of equaliser parameters;
   means for estimating at least one parameter of a channel over which the signal has been received, wherein the channel has energy outside a predefined temporal window and one of said estimated channel parameters provides an estimate of the energy of the channel outside the predefined temporal window; and means for selecting at least one of said equaliser parameters based on at least one of said estimated channel parameters, wherein said at least one of said equaliser parameters is used to implement the equaliser algorithm.

20. A radio receiver according to claim 19, comprising a processor and wherein the channel equalisation means, estimate means and selecting means comprise code sequences executable by the processor.

21. A radio receiver according to claim 20, comprising a memory holding said code sequences.

* * * * *